US009614739B2

(12) United States Patent
Kumar et al.

(10) Patent No.: US 9,614,739 B2
(45) Date of Patent: Apr. 4, 2017

(54) DEFINING SERVICE CHAINS IN TERMS OF SERVICE FUNCTIONS

(71) Applicant: Cisco Technology, Inc., San Jose, CA (US)

(72) Inventors: Surendra Kumar, San Ramon, CA (US); Nagaraj Bagepalli, Fremont, CA (US); Abhijit Patra, Saratoga, CA (US); Paul Quinn, Wellesley, MA (US); James Guichard, New Boston, NH (US); Jayaraman Iyer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 564 days.

(21) Appl. No.: 14/168,447

(22) Filed: Jan. 30, 2014

(65) Prior Publication Data

US 2015/0215172 A1    Jul. 30, 2015

(51) Int. Cl.
   *G06F 15/16*     (2006.01)
   *H04L 12/26*     (2006.01)
   *H04L 12/24*     (2006.01)

(52) U.S. Cl.
   CPC ........ *H04L 43/026* (2013.01); *H04L 41/5041* (2013.01)

(58) Field of Classification Search
   CPC .......................... H04L 43/026; H04L 41/5041
   USPC ........................................ 709/223, 225, 230
   See application file for complete search history.

(56) References Cited

U.S. PATENT DOCUMENTS

| 7,558,261 | B2 | 7/2009 | Arregoces et al. | |
|---|---|---|---|---|
| 7,571,470 | B2 | 8/2009 | Arregoces et al. | |
| 7,610,375 | B2 | 10/2009 | Portolani et al. | |
| 7,643,468 | B1 | 1/2010 | Arregoces et al. | |
| 7,657,940 | B2 | 2/2010 | Portolani et al. | |
| 7,895,425 | B2 * | 2/2011 | Khalid | H04L 12/4633 709/226 |
| 8,311,045 | B2 | 11/2012 | Quinn et al. | |
| 8,442,043 | B2 | 5/2013 | Sharma et al. | |
| 8,638,795 | B2 * | 1/2014 | Jackowski | H04L 47/2441 370/389 |
| 2006/0092950 | A1 | 5/2006 | Arregoces et al. | |
| 2006/0095960 | A1 | 5/2006 | Arregoces et al. | |
| 2008/0177896 | A1 | 7/2008 | Quinn et al. | |
| 2010/0080226 | A1 * | 4/2010 | Khalid | H04L 41/5003 370/392 |
| 2010/0165985 | A1 | 7/2010 | Sharma et al. | |

(Continued)

OTHER PUBLICATIONS

Rosen, et al., "BGP/MPLS IP Virtual Private Networks (VPNs)," Network Working Group, RFC 4364, Feb. 2006, pp. 1-47.

(Continued)

*Primary Examiner* — Viet Vu

(74) *Attorney, Agent, or Firm* — Edell, Shapiro & Finnan, LLC

(57) ABSTRACT

Presented herein are service-function chaining techniques. In one example, a service controller in a network comprising a plurality of service nodes receives one is configured to identify one or more service-functions hosted by each of the service nodes. The service controller defines a service-function chain in terms of service-functions to be applied to traffic in the network and provides information descriptive of the service-function chain to a classifier node.

18 Claims, 7 Drawing Sheets

(56) References Cited

U.S. PATENT DOCUMENTS

2013/0163594 A1* 6/2013 Sharma ................. H04L 45/64
370/392
2016/0050141 A1* 2/2016 Wu ..................... H04L 41/5054
370/389

OTHER PUBLICATIONS

Parker, R., "Service Function Chaining: Chain to Path Reduction, draft-parker-sfc-chain-to-path-00", SFC, IETF, Internet Draft, Nov. 8, 2013, 11 Pages.
Boucadair et al., "Differentiated Service Function Chaining Framework, draft-boucadair-service-chaining-framework-00", Network Working Group, Internet-Draft, Aug. 30, 2013, 24 Pages.

* cited by examiner

DEFINING SERVICE CHAINS IN TERMS OF SERVICE FUNCTIONS

TECHNICAL FIELD

The present disclosure relates to networking for service chains.

BACKGROUND

Network services are widely deployed and useful in many networks. The services (service-functions) provide a range of functions such as security, wide area network (WAN) acceleration, firewall, Network Address Translation (NAT), deep packet inspection (DPI), intrusion detection service (IDS), server load balancing, etc. Service-functions may be physically located at different points in the network infrastructure, such as the WAN, data center, campus, and so forth.

In certain circumstances, service-functions may be applied as part of a "service chain." A service chain is a data structure defining a set of service nodes hosting various service-functions and the order in which the service-functions should be applied to the data/payload (e.g., video data, numeric data, alphanumeric data, voice data, etc.) of selective traffic (packets/frames).

DESCRIPTION OF EXAMPLE EMBODIMENTS

Overview

Figure 1:
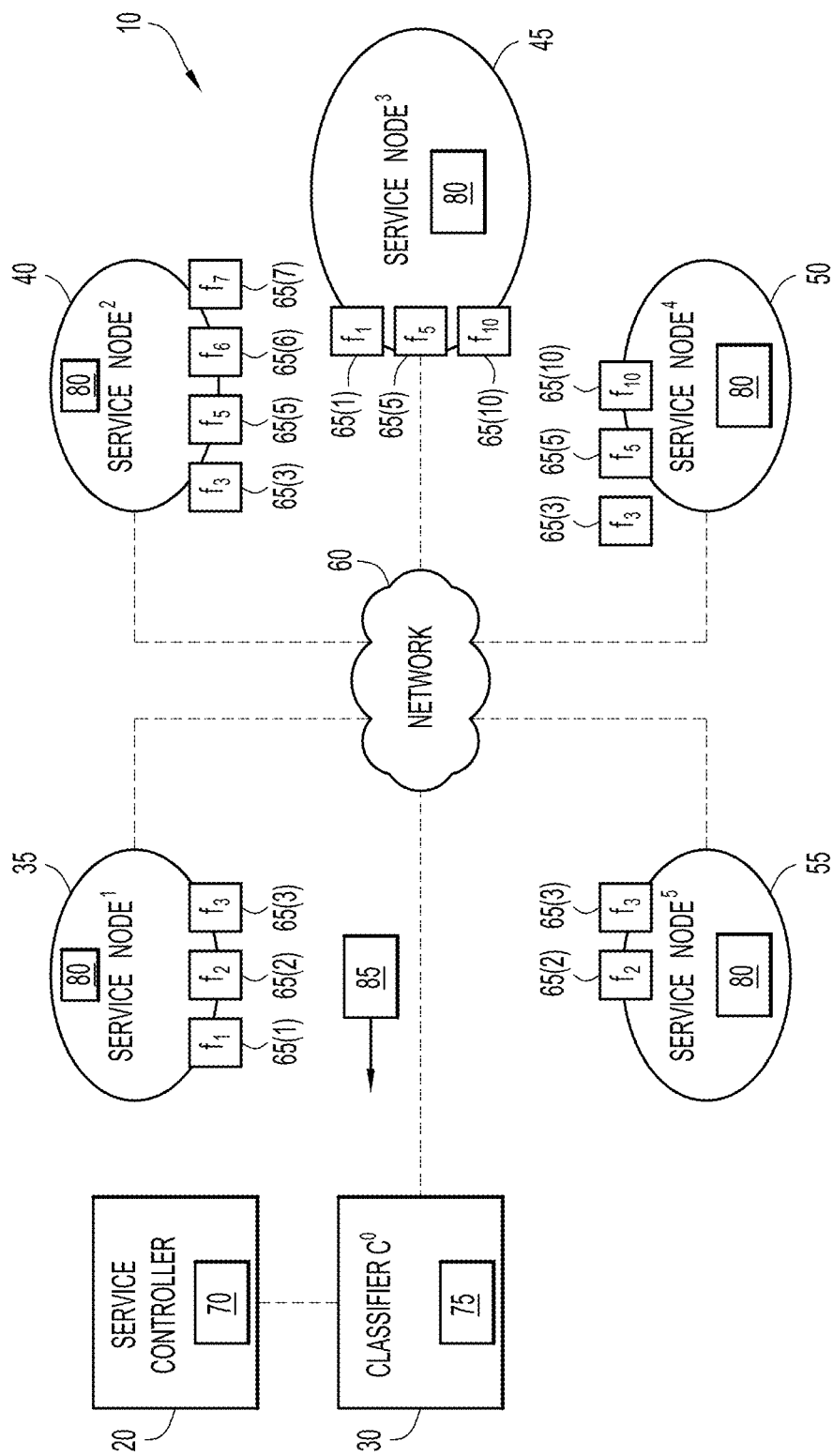
FIG. 1 is a block diagram of an example computing environment configured to implement service-function chaining techniques in accordance with examples presented herein.

Presented herein are service-function chaining techniques. In one example, a service controller in a network comprising a plurality of service nodes receives one is configured to identify one or more service-functions hosted by each of the service nodes. The service controller defines a service-function chain in terms of service-functions to be applied to traffic in the network and provides information descriptive of the service-function chain to a classifier node.

Example Embodiments

Service chaining primarily involves the interception of traffic and steering the traffic through a series of service nodes (i.e., physical or virtual devices) that each host one or more service-functions. The traffic is intercepted through the use of a classifier function at a node (i.e., switch, router, etc.) that serves as a head-end node to the service chain. The node that executes the classifier function is sometimes referred to herein as a "classifier" or "classifier node." In general, the traffic is steered from the classifier through the service-functions using one or more Layer 2 (L2)/Layer 3 (L3) service overlays in the network. In addition, a service header is appended to the traffic for forwarding through the service chain and the service header enables the carrying of service metadata in addition to the original data/payload.

A service header is part of the data-plane of a service chain and includes metadata specifically formatted for consumption by a service-function. The metadata may include, for example, an application identifier (ID), flow or path ID, and client or user ID, network classification information used for deriving targeted service policies and profiles, common metadata related to a particular service such as finer classification that can be passed to the service-functions further down the service-path. In other words, service-functions benefit from metadata derived both from the network as well as the service-functions that form a given service chain. Metadata can also be passed between network nodes and be used, for example, to determine forwarding state at the end of a service chain.

In conventional service chaining techniques, the service chain is an ordered sequence of service-functions (e.g., firewall, server load balancer, IPS/IDS, etc.) defined in terms of actual service nodes having a network location where the service node is reachable and where the service-functions are hosted. In other words, conventional service chains do not specify actual service-function(s) to be applied, but instead specify the network location where a set of such service-function(s) are applied.

For example, a service chain in conventional techniques may be defined as:

$SC_0$: C1: S1→S2→S3 where, $SC_0$ is the service chain identifier, S1, S2, S3 are service nodes, and C1 is the primary classifier (i.e., a classifier external to the service nodes).

As noted, the service nodes are described/defined in terms of their attributes and reachability or physical network address information (e.g., Internet Protocol (IP) address, virtual local area network (VLAN) information, etc.). For example, the service nodes S1, S2, and S3 in the above example may be defined as:

S1: IP-address1, VLAN10, . . . .
S2: IP-address2, VXLAN20, . . . .
S3: IP-address3, VRF-blue, . . . .

In these conventional techniques, the selection of the actual service-function(s) to apply at a given service node is left to the service node itself. That is, a primary classification is performed at the head-end node (classifier) and a secondary classification is performed at the service node (i.e., each service node has to perform additional internal classification to determine the actual service-functions to be applied). To conceptualize, the above service chain $SC_0$ can be re-written to show the secondary classification within the service nodes as:

$SC_0$: c1@S1→c2@S2→c3@S3 where c1, c2, c3 are secondary classification policies inside service nodes S1, S2, and S3 respectively.

The actual service-functions selected at the service nodes are exposed only when the primary classifier (in the network) chooses $SC_0$ as the service chain for certain traffic and steers the selected traffic on the service overlay (using a service header) to the service nodes. To conceptualize further, the above service chain $SC_0$ can now be re-written to show not only classification, but also the service-functions selected for a traffic flow (flow1) by each service node as:

SC₀,flow1: $<c1:f_1,f_2>@S1 \rightarrow <c2:f_6,f_7>@S2 \rightarrow <c3:f_{10}>@S3$ where $f_1 \ldots fn$ are service-functions.

As a result of the need for secondary classifications within a service node, traditional service chaining techniques are unable to provide a global view of the applied services-functions. In the emerging controller driven network architectures, a global view of the delivered service-functions delivered may be useful. Delegation of service-function selection to the service nodes is becoming less viable in such architectures. Further, new technologies split the configuration and management aspects among multiple components of the architecture. In most cases the actual service-functions delivered by service nodes are configured and managed separately by a service node specific component.

Presented herein are "service-function chaining" techniques where the service chain is defined in terms of the service-functions to be applied to traffic, rather than in terms of the service nodes hosting the service-functions. In accordance with the techniques presented herein, the configuration and management aspects are externalized from the service nodes. By separating such configuration and management from the service nodes, the service-functions can be chosen freely from various locations in the network in a dynamic manner based on various parameters to, for example, guarantee service-level agreements (SLAs).

If actual service-functions, rather than service nodes, are identified by the service controller, the classifier selecting the service-function chain can precisely identify the service-functions needed upfront. This will enable selection (utilization of) the service-function from an appropriate service node. As such, the techniques presented herein simplify service delivery while efficiently utilizing the resources used to deliver the service.

Reference is now made to FIG. 1 for a description of an example computing network 10 in which the techniques presented herein may be employed. The computing network 10 comprises a service controller 20, a classifier node (classifier) 30, and a plurality of service nodes 35, 40, 45, 50 and 55. The classifier node 30 is in communication with the service controller 20 and a network 60. The plurality of service nodes 35, 40, 45, 50 and 55 are also connected to the network 60. The service nodes 35, 40, 45, 50 and 55 are sometimes referred to herein as network nodes and the classifier node 30 is sometimes referred to herein as a head-end node.

The service nodes 35, 40, 45, 50, and 55 each host/support one or more service-functions (services) for application to the payload of traffic passing through the respective service node. More specifically, service node 35 hosts service-functions 65(1) (service-function $f_1$), 65(2) (service-function $f_2$), and 65(3) (service-function $f_3$), while service node 40 hosts service-functions 65(3) (service-function $f_3$), 65(5) (service-function $f_5$), 65(6) (service-function $f_6$), and 65(7) (service-function $f_7$). Service node 45 hosts service-functions 65(1) (service-function $f_1$), 65(5) (service-function f5), and 65(10) (service-function $f_{10}$), while service node 50 hosts service-functions 65(3) (service-function $f_3$), 65(5) (service-function $f_5$), and 65(10) (service-function $f_{10}$). Finally, service node 55 hosts service-functions 65(2) (service-function $f_2$) and 65(3) (service-function $f_3$). As shown, service-functions may appear in multiple instances on different service nodes or on the same service node. For example, service-function $f_3$ is hosted on each of the service nodes 35, 40, 50 and 55.

The service controller 20 comprises service-function chaining logic 70 and the classifier 30 comprises classification and mapping logic 75. The service nodes 35, 40, 45, 50, and 55 each comprise advertisement logic 80. In operation, the advertisement logic 80 at each of the service nodes 35, 40, 45, 50, and 55 is configured to generate an advertisement or notification that indicates the service-functions that the respective service node hosts (i.e., each service node exposes its service-functions to the central service controller). For example, the advertisement logic 80 at service node 35 may generate an advertisement 85 indicating that the service node 35 hosts service-functions $f_1$, $f_2$, and $f_3$. The advertisement 85 may then be provided to service controller 20 and/or classifier 30

The service-function chaining logic 70 at service controller 20 is configured to define one or more "service-function chains" (SFCs) for selection by the classification and mapping logic 75 of classifier 30. As used herein, a "service-function chain" is an ordered list of service-functions defined in terms of the service-functions to be applied, and not in terms of service nodes that apply service-functions (i.e., the service-function chain is not defined in terms of network addresses for devices that host service-functions). More specifically, the location information of service nodes that host service-functions is not part of the defined service-function chain. Rather, as described further below, the selection of the location where the service-functions are available is performed at the classifier 30.

In accordance with examples presented herein, defining a service-function chain, rather than a service chain, advantageously eliminates the need for secondary classifiers within the service nodes. That is, as described further below, the classification and mapping logic 75 of classifier 30 is configured to dynamically select instances of service-functions that may form part of a service-function chain based on classification rules as well as various conditions such as load, resources, etc. Due to the advertisement 85, the classifier 30 is aware of service-functions hosted on the service nodes 35, 40, 45, 50, and 55 and the classification and mapping logic 75 can map the service-function chains to instances of service-functions.

Figure 2:
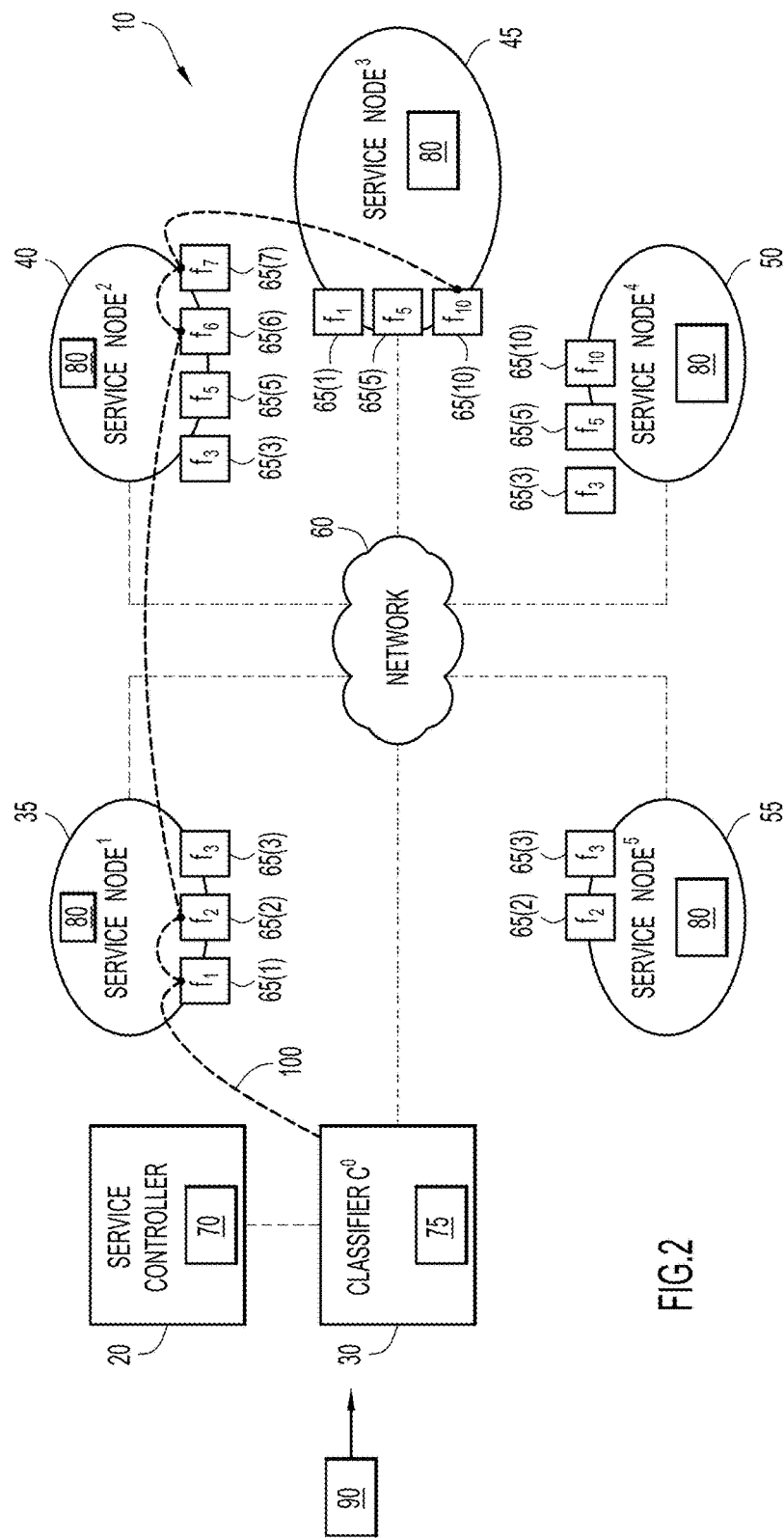
FIG. 2 is a block diagram illustrating an example implementation of the service-function chaining techniques.

FIG. 2 is a schematic diagram illustrating service-function chaining techniques in accordance with examples presented herein. For ease of reference, the example of FIG. 2 will be described with reference to the computing network 10 of FIG. 1.

In the example of FIG. 2, service-function chaining logic 70 defines two service-function chains that are available for selection at classifier 30. The first service-function chain, (SFC₁) may be defined as service-functions $f_1 \rightarrow f_2 \rightarrow f_6 \rightarrow f_7 \rightarrow f_{10}$ (i.e., $SFC_1 = f_1 \rightarrow f_2 \rightarrow f_6 \rightarrow f_7 \rightarrow f_{10}$). A second service-function chain (SFC₂) may be defined as service-functions $f_3 \rightarrow f_5 \rightarrow f_{10}$ (i.e., $SFC_2 = f_3 \rightarrow f_5 \rightarrow f_{10}$).

In one example, the service-function chains may be constructed initially by specifying a series of service-function classes (types) (e.g., firewall, Network Address Translation (NAT), load balancer, and deep packet inspection). For example, the service-function chaining logic 70 may obtain (via an interface, from memory, etc.) an ordered list of service types. Where those classes of services reside within the infrastructure is not described. The service controller 20 may then use class/type definitions, the obtained list, and the advertised capabilities of the service nodes, to create a service-function chain (i.e., a chain in terms of service-functions).

In the example of FIG. 2, classifier 30 intercepts traffic 90 for steering through a service-function chain defined by service controller 20. Using information (e.g., rules, policies, etc.) provided by service controller 20, classification and mapping logic 75 determines that traffic 90 should be steered through service-function chain $SFC_1$ that comprises ordered service-functions $f_1$, $f_2$, $f_6$, $f_7$, and $f_{10}$.

As noted above, conventional service chains require two classifications. First, conventional techniques require a primary classification to be performed at a classifier to select a service chain (i.e., a chain defined in terms of service nodes). In other words, the classifier selects a series of service nodes to which the traffic should be steered. When each service node receives the traffic, conventional techniques require a secondary classification to be performed within the service node itself to select which service-functions hosted by the service node should be applied to the traffic. In accordance with the examples presented herein, the secondary classification required in conventional arrangements is eliminated and only one classification (which is external to the service nodes) is performed by classifier 30.

More specifically, the classification and mapping logic 75 of classifier 30 includes a mapping mechanism to dynamically map the selected service-functions (i.e., the service-functions forming the selected service chain $SFC_1$) to actual service nodes. This mapping is designed to select the instances of the service-functions that will be applied as part of the service-function chain (i.e., which instances of service-functions will actually be used to service the particular traffic 90). The mapping may be based, for example, on the processing load of different service nodes, available bandwidth, or availability of resources in general at a service node. Alternatively, the mapping could be based on location of service-functions within the network (e.g., relative proximity of the service-functions to each other to achieve optimal latency, etc.). The service-function chaining enables optimal service delivery with dynamic service node selection.

In the example of FIG. 2, classification and mapping logic 75 selects service-functions from several different service nodes. In particular, classification and mapping logic 75 selects service-functions $f_1$ and $f_2$ at service node 35, service-functions $f_6$ and $f_7$ at service node 40, and service-function $f_{10}$ at service node 45. The path for service-function chain $SFC_1$ selected by classification and mapping logic 75 is shown in FIG. 2 by broken line 100. The classifier 30 sends traffic 90 along the path 100 using one or more L2/L3/L4 service overlays in the network. In other words, a service header is appended to the traffic 90 for forwarding through the service chain and the service header enables the carrying of service metadata in addition to the original data/payload.

Service-function $f_{10}$ is the end of the service-function chain $SFC_1$. After processing the traffic 90, the service-function $f_{10}$ may forward the traffic 90 to its original or other destination.

Figure 3:
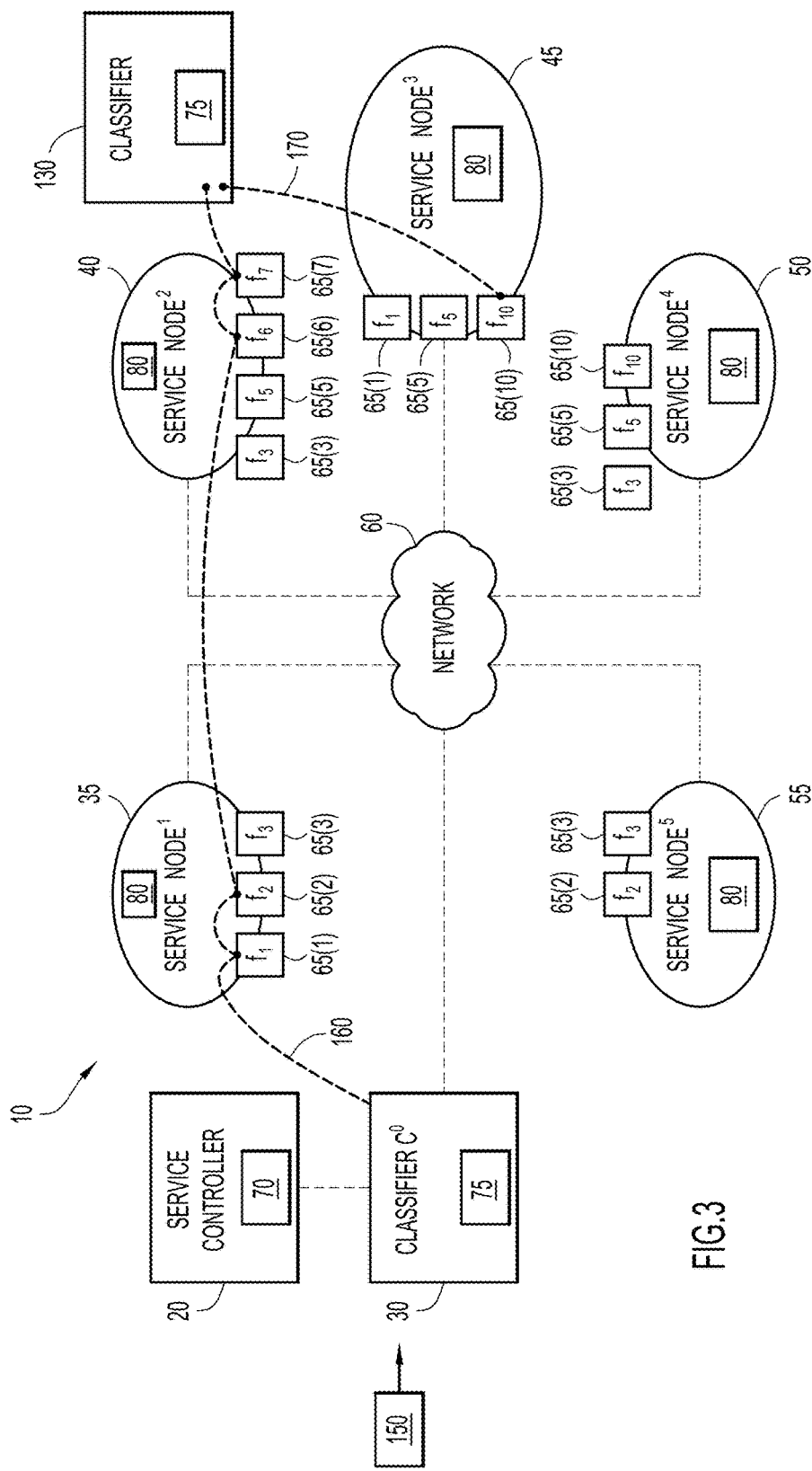
FIG. 3 is a block diagram illustrating another example implementation of the service-function chaining techniques.

FIG. 2 illustrates an example where only one primary classifier (i.e., one classifier external to all service nodes) is present. However, it is to be appreciated that multiple primary classifiers external to the service nodes may be present in a service-function chain. FIG. 3 illustrates one such example where multiple classifiers are present and external to the service nodes. Again, for ease of reference, the example of FIG. 3 will be described with reference to the computing network 10 of FIG. 1.

In certain circumstances, service-functions may change the flow specification (e.g., the 5-tuple comprises the source IP address, destination IP address, source port number, destination port number and the protocol in use) of processed packets. That is, traffic may be received at a service-function with a certain 5 tuple, but, after processing at the service-function, the traffic will include a different 5 tuple.

When the flow specification of traffic is changed, the traffic may need to be processed by different service-functions than those identified in the initial service-function chain. Service-functions that are capable of changing the flow specification of traffic are sometimes referred to herein as modifying service-functions.

In accordance with examples presented herein, the service controller 20 is configured to identify modifying service-functions. When a service-function chain includes a modifying service-function, the service controller 20 is configured to include an additional classifier into the service-function chain after the modifying service-function. The additional classifier is configured to, in essence, re-classify the traffic processed by the modifying service-function.

In the example of FIG. 3, an additional classifier 130. Additional classifier 130 includes classification and mapping logic 75. As such, the additional classifier 130 is configured to perform similar operations as those of the initial classifier 30.

As noted, service controller 20 may receive advertisements from service nodes 35, 40, 45, 50, and 55. Based on these advertisements, the service controller 20 determines that service-function $f_7$ is hosted at service node 40. The service controller 20 also determines that service-function $f_7$ is a modifying service-function (i.e., service-function $f_7$ is capable of changing the flow specification of processed traffic). In the example of FIG. 3, service controller 20 defines service-function chains that include service-function $f_7$ to account for the capability of service-function $f_7$ to change the flow specification.

More specifically, service-function chaining logic 70 defines two service-function chains that are available for selection at classifier 30. A first service-function chain, ($SFC_3$) may be defined as service-functions $f_1 \rightarrow f_2 \rightarrow f_6 \rightarrow f_7 \rightarrow f_{10}$ (i.e., $SFC_3 = f_1 \rightarrow f_2 \rightarrow f_6 \rightarrow f_7 \rightarrow f_{10}$). A second service-function chain ($SFC_4$) may be defined as service-functions $f_3 \rightarrow f_5 \rightarrow f_{10}$ (i.e., $SFC_2 = f_3 \rightarrow f_5 \rightarrow f_{10}$). As such, service-function $f_7$ is part of a service-function chain $SFC_3$ defined by service controller 20.

In the example of FIG. 3, due to the inclusion of a modifying service-function in the service-function chain, service controller 20 re-defines $SFC_3$ as a "stacked service-function chain" (stacked SFC) comprising two sub-chains $SFC_{3a}$ and $SFC_{3b}$ that are each initiated at a different primary classifier (i.e., a classifier external to the service nodes). In other words, a first classifier initiates the first sub-chain $SFC_{3a}$ and a second classifier initiates the second sub-chain $SFC_{3b}$. In essence, a classifier is inserted into the service-function chain $SFC_3$ (i.e., the service-function chain is defined so as to include a classifier). The first sub-chain $SFC3_a$ comprises service-functions $f_1$, $f_2$, $f_6$, and $f_7$ (i.e., $SFC_{3a} = f_1 \rightarrow f_2 \rightarrow f_6 \rightarrow f_7$), while the second sub-chain $SFC_{3b}$ comprises service-function $f_{10}$ (i.e., $SFC_{3b} = f_{10}$).

In the example of FIG. 3, classifier 30 intercepts traffic 150 for steering through a service-function chain defined by service controller 20. Using information (e.g., rules, policies, etc.) provided by service controller 20, classification and mapping logic 75 determines that traffic 150 should be steered through service-function chain $SFC_3$ that comprises first sub-chain $SFC_{3a}$ and the second sub-chain $SFC3_b$.

As noted above, the classification and mapping logic 75 of classifier 30 includes a mapping mechanism to dynamically map the selected service-functions to actual service nodes. This mapping is designed to select the instances of the service-functions that will be applied as part of the service-function chain (i.e., which instances will actually be used to service the particular traffic 150).

In the example of FIG. 3, classification and mapping logic 75 selects service-functions $f_1$ and $f_2$ at service node 35, service-functions $f_6$ and $f_7$ at service node 40, and service-function $f_{10}$ at service node 45. In other words, service-function chain $SFC_3$ may be resolved as:
$SFC_{3a}$: $C_0$:<$f_1$@S1→$f_2$@S1→$f_6$@S2→$f_7$@S2>
$SFC_{3b}$: $C_1$<$f_{10}$@S3>
where $C_0$ is classifier 30 and $C_1$ is classifier 130.

The path for service-function sub-chain $SFC_{3a}$ selected by classification and mapping logic 75 is shown in FIG. 3 by broken line 160, while the path for service-function sub-chain $SFC_{3b}$ selected by classification and mapping logic 75 is shown in FIG. 3 by broken line 170. The classifier 30 sends traffic 150 along the path 160 using one or more L2/L3/L4 service overlays in the network. Once the traffic 150 is serviced by $f_7$, the traffic 150 is re-classified at classifier 130 to choose $SFC_{3b}$ and is steered through $f_{10}$. After processing the traffic 150, the service-function $f_{10}$ may forward the traffic 150 to its original or other destination. In the above example, the first primary classifier 30 only performs mapping for the first sub-chain $SFC_{3a}$ while the second primary classifier 130 performs mapping for the second sub-chain $SFC_{3b}$.

Figure 4:
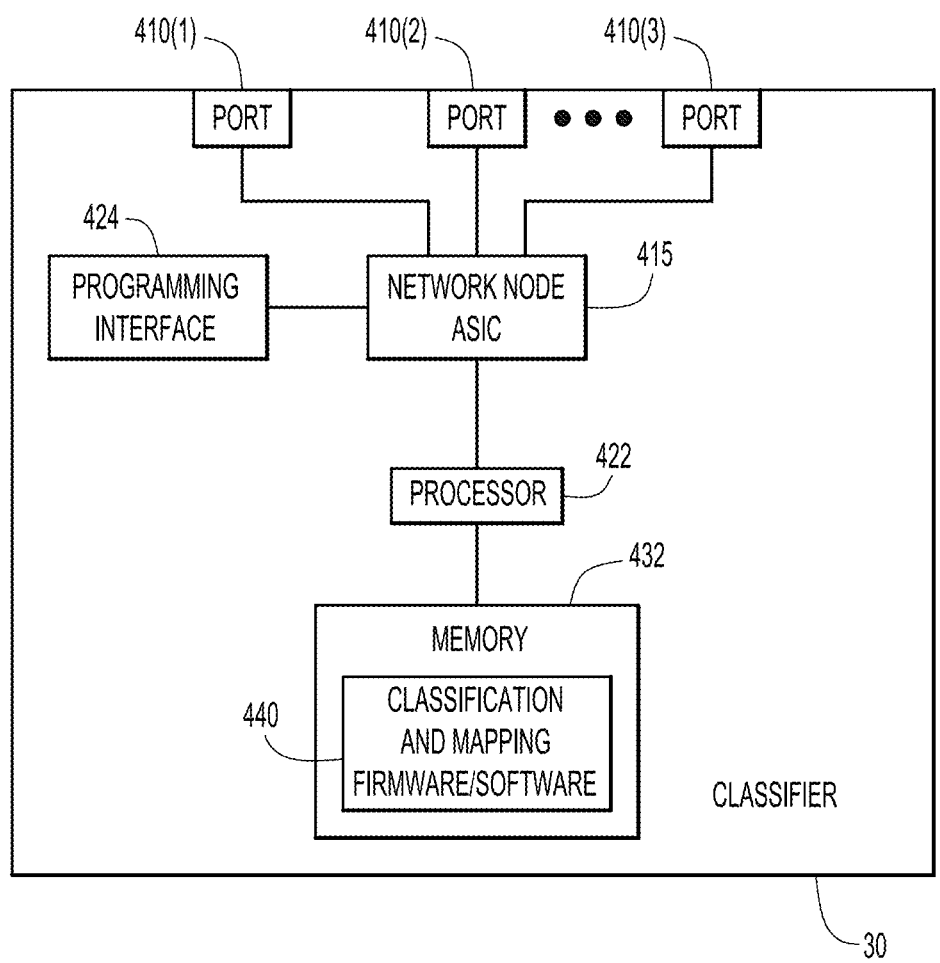
FIG. 4 is a block diagram of a classifier node in accordance with examples presented herein.

FIG. 4 illustrates an example block diagram of classifier 30, e.g., a switch, router, gateway, or any network device or node configured to perform certain operations described herein. It should be understood that a virtual network node would be a software-emulated or virtualized version of what is shown in FIG. 4. The classifier 30 comprises a plurality of ports 410(1)-410($m$), a programming interface 424, a network Application Specific Integrated Circuit (ASIC) 415, a processor or central processing unit (CPU) 422, and memory 432. The ports 410(1)-410($m$) receive ingress packets and output egress packets from the network node. In certain examples, one or more of the ports 410(1)-410($m$) are connected to VLANs for forwarding packet data to service-functions.

The network node ASIC 415 directs incoming packets to ports for egress according to logic as well as controls from the processor 422. For example, if the network node is a router, then the ASIC 415 is a router ASIC configured for network routing functions, and if the network node is a switch, then the ASIC 415 is a switch ASIC configured for network switch functions. The processor 422 is a microprocessor or microcontroller, for example, and executes instructions for the classification and mapping firmware/software 440 stored in memory 432. The classification and mapping firmware/software 440, includes instructions that, when executed by the processor 422, cause the processor to perform the operations described herein with reference classification and mapping logic 75.

The memory 432 may comprise read only memory (ROM), random access memory (RAM), magnetic disk storage media devices, optical storage media devices, flash memory devices, electrical, optical, or other physical/tangible memory storage devices. In general, the memory 432 may comprise one or more tangible (non-transitory) computer readable storage media (e.g., a memory device) encoded with software comprising computer executable instructions and when the software is executed (by the processor 422) it is operable to perform the operations described herein.

As noted, the classifier 30 may also comprise a programming interface 424. The programming interface 424 is arranged to enable configuration of rules, policies, and/or other information that is used by the classifier 30 to select a service-function chain and to map the service-functions in the chain to service-function instances at service node. The programming interface 424 may be, for example, a port or input for connection to another device (e.g., computer, server, controller, etc.), a command-line-interface (CLI), etc.

Figure 5:
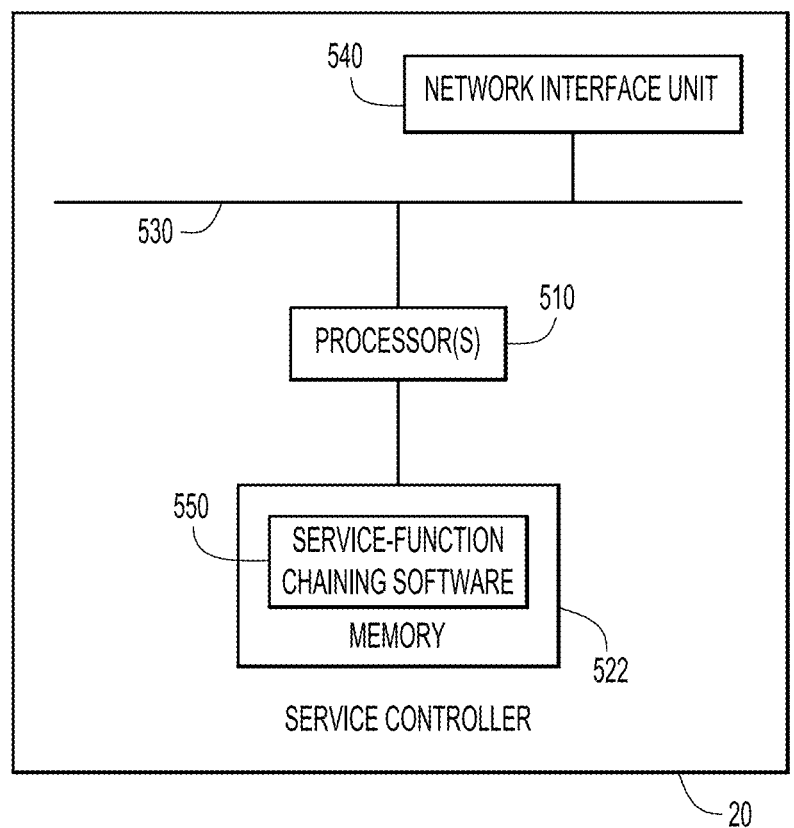
FIG. 5 is a block diagram of a service controller in accordance with examples presented herein.

FIG. 5 is an example block diagram of service controller 20. It should be understood that a virtual controller would be a software-emulated or virtualized version of what is shown in FIG. 5, such as software running on commodity hardware in a data center. The service controller 20 includes one or more processors 510, memory 522, a bus 530 and a network interface unit 540. The processor 510 may be a microprocessor or microcontroller. The network interface unit 540 facilitates network communications between the service controller 20 and network nodes (e.g., classifiers, service nodes, etc.). The processor 510 executes instructions associated with software stored in memory 522. Specifically, the memory 522 stores service-function chaining software 550 that, when executed by the processor 510, causes the processor 510 to perform the service-function chaining operations described herein.

The memory 522 may comprise read only memory (ROM), random access memory (RAM), magnetic disk storage media devices, optical storage media devices, flash memory devices, electrical, optical, or other physical/tangible memory storage devices. In general, the memory 522 may comprise one or more tangible (non-transitory) computer readable storage media (e.g., a memory device) encoded with software comprising computer executable instructions and when the software is executed (by the processor 510) it is operable to perform the operations described herein.

Figure 6:
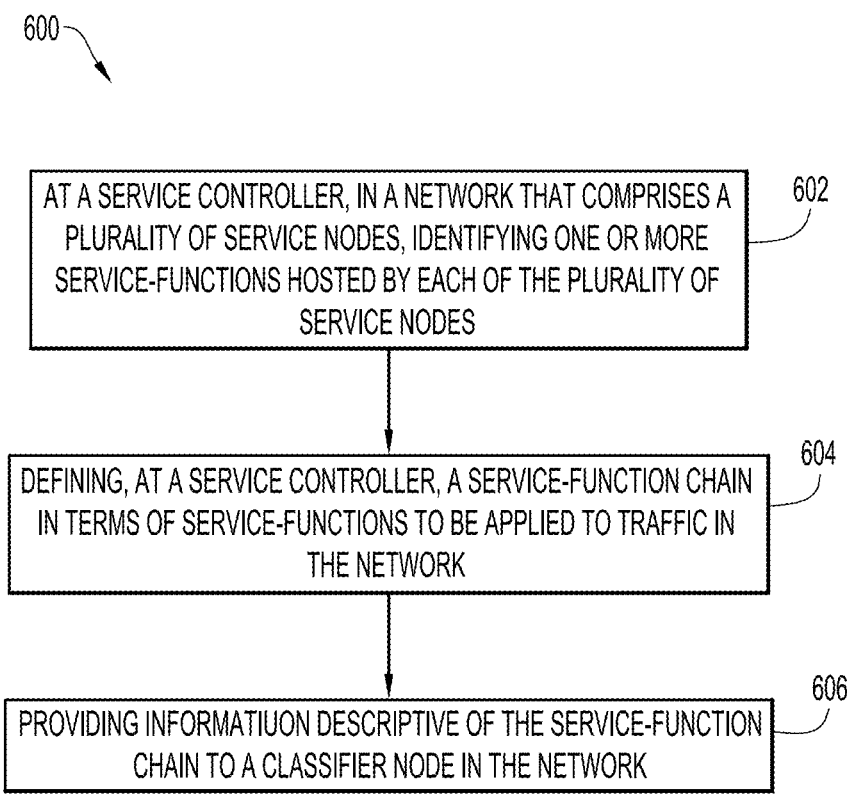
FIG. 6 is a flowchart of a process executed at a service controller in accordance with examples presented herein.

FIG. 6 illustrates a flowchart that depicts the operations of a process 600 performed at a service controller in a network comprising a plurality of service nodes. Process 600 starts at 602 where the service controller identifies one or more service-functions hosted by each of the plurality of service nodes. In certain examples, the service controller receives one or more notifications from each of the service nodes that include information indicating/identifying one or more service-functions hosted by the respective service node. In other examples, an orchestration software that instantiates service nodes (typically virtual machine based service nodes) can also notify the service controller about the composition of the service nodes with respect to the service-functions.

At 604, the service controller defines a service-function chain in terms of service-functions to be applied to traffic in the network. At 606, the service controller provides information descriptive/representative of the service-function chain to a classifier node in the network.

Figure 7:
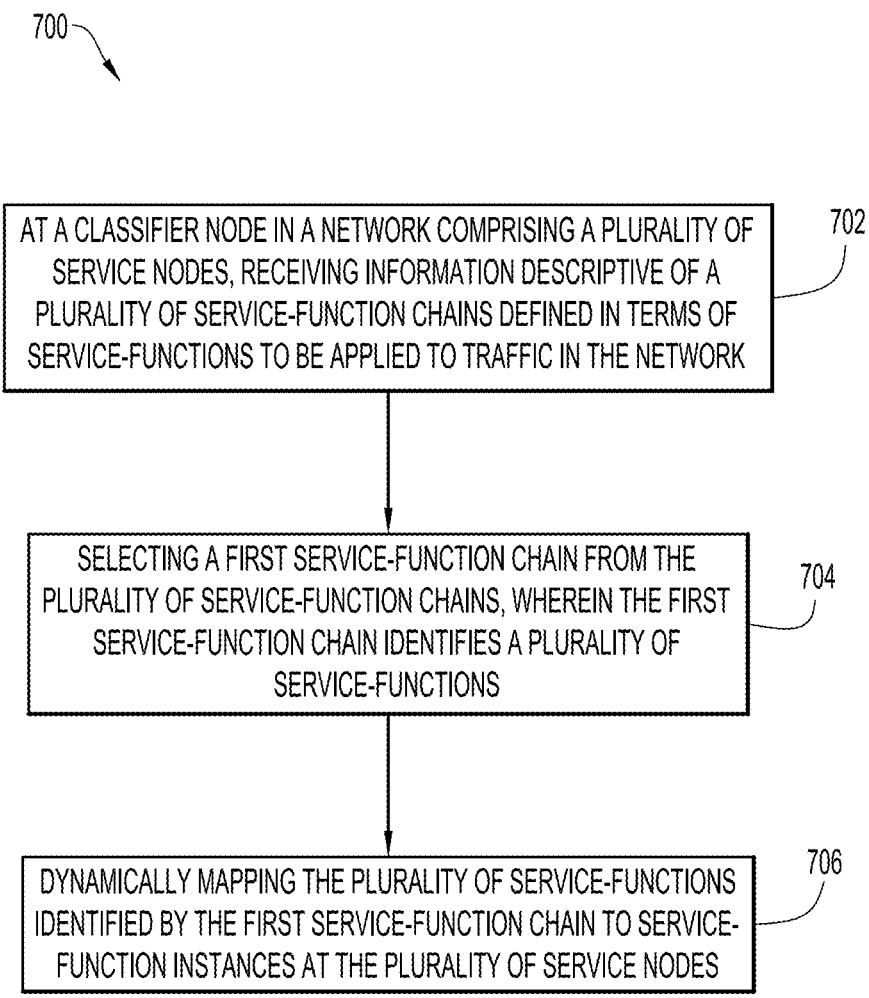
FIG. 7 is a flowchart of a process executed at a classifier node in accordance with examples presented herein.

FIG. 7 illustrates a flowchart that depicts the operations of a process 700 performed at a classifier node in a network comprising a plurality of service nodes. Process 700 starts at 702 where the classifier node receives information descriptive of a plurality of service-function chains defined in terms of service-functions to be applied to traffic in the network. At 704, the classifier node selects a first service-function chain from the plurality of service-function chains. The selected first service-function chain identifies a plurality of service-functions. At 706, the classifier dynamically maps the plurality of service-functions identified by the first service-function chain to service-function instances at the plurality of service nodes.

In summary, techniques are presented herein to define chains of services in terms of the service-functions to be applied to traffic, rather than in terms of the physical reachability information of service nodes that host service-functions. The service-function chaining techniques presented herein frees the chains of services from being statically bound to service nodes and localizes service classification outside (external to) the service nodes. By localizing the service classification, the burden on service nodes may be reduced since the service nodes do not have to waste resources, including processing, in choosing service-function(s) within the service node. Additionally, controller-based architectures can fully exploit the fine-grain characteristics of the service-function chaining techniques to build service chains that are dynamically fragmented and serviced by dynamically selected service nodes in the network. The service-function chaining techniques may also simplify the control/management plane by providing a global view of the actual service-functions. This reduces the complexity of configuring, provisioning and managing the service-functions in different service nodes. Furthermore, the service-function chaining techniques may enable pooling of service-functions in purpose built service nodes, for performance and scaling needs, particularly in (although not limited to) virtual environments.

The above description is intended by way of example only. Various modifications and structural changes may be made therein without departing from the scope of the concepts described herein and within the scope and range of equivalents of the claims.

What is claimed is:

1. A method comprising:
at a service controller in a network comprising a plurality of service nodes, identifying one or more service-functions hosted by each of the service nodes;
defining, at the service controller, a stacked service-function chain in terms of service-functions to be applied to traffic in the network, wherein the stacked service-function chain specifies at least one additional classifier node, and wherein the stacked service-function chain separates first and second sub-chains of the service-function chain;
identifying a modifying service-function configured to change the flow specification of traffic processed by the modifying service-function;
determining that the modifying service-function is to be part of the stacked service-function chain; and
inserting the at least one additional classifier node into the stacked service-function chain immediately after the modifying service-function; and
providing information descriptive of the stacked service-function chain to a classifier node in the network.

2. The method of claim 1, further comprising:
receiving one or more notifications from each of the service nodes for use in identifying one or more service-functions hosted by the respective service node; and
identifying a modifying service-function based on the one or more notifications received from each of the service nodes.

3. The method of claim 1, further comprising:
obtaining an ordered list of service types; and
defining a service-function chain based on the service types and predetermined definitions of the service types.

4. The method of claim 1, further comprising:
defining a plurality of service-function chains;
providing information descriptive of the plurality of service-function chains to the classifier node; and
providing the classifier node with information useable to select one of the plurality of service-function chains for use in servicing traffic intercepted by the classifier node.

5. The method of claim 4, further comprising:
at the classifier node, determining that received traffic should be steered through one of the plurality of service-function chains; and
selecting a first service-function chain from the plurality of service-function chains using the information provided by the service controller, wherein the first service-function chain identifies a plurality of service-functions.

6. The method of claim 5, further comprising:
at the classifier node, dynamically mapping the plurality of service-functions identified by the first service-function chain to service-function instances at the plurality of service nodes.

7. The method of claim 6, wherein dynamically mapping comprises:
dynamically mapping the plurality of service-functions identified by the first service-function chain to service-function instances at the plurality of service nodes based on at least one of the processing load of one or more service nodes or the availability of resources at one or more service nodes.

8. The method of claim 6, wherein dynamically mapping comprises:
dynamically mapping the plurality of service-functions identified by the first service-function chain to service-function instances at the plurality of service nodes based on location of service-functions within the network.

9. An apparatus comprising:
a network interface configured to communicate with a plurality of service nodes; and
a processor coupled to the network interface configured to:
identify one or more service-functions hosted by each of the service nodes;
define a stacked service-function chain in terms of service-functions to be applied to traffic in a network, wherein the stacked service-function chain specifies at least one additional classifier node, and wherein the stacked service-function chain separates first and second sub-chains of the service-function chain;
identify a modifying service-function configured to change the flow specification of traffic processed by the modifying service-function;
determine that the modifying service-function is to be part of the stacked service-function chain;
insert the at least one additional classifier node into the stacked service-function chain immediately after the modifying service-function; and
generate information descriptive of the stacked service-function chain, the information to be supplied a classifier node in the network.

10. The apparatus of claim 9, wherein the processor is configured to:
receive one or more notifications from each of a plurality of service nodes; and
identify a modifying service-function based on the one or more notifications received from each of the plurality of service nodes.

11. The apparatus of claim 9, wherein the processor is configured to:
obtain an ordered list of service types; and
define a service-function chain based on the service types and predetermined definitions of the service types.

12. The apparatus of claim 9, wherein the processor is configured to:
define a plurality of service-function chains;
provide, via the network interface unit, information descriptive of the plurality of service-function chains to the classifier node; and
provide the classifier node with information useable to select one of the plurality of service-function chains for use in servicing traffic intercepted by the classifier node.

13. One or more non-transitory computer readable storage media encoded with instructions that, when executed by a processor, cause the processor to:
at a service controller in a network comprising a plurality of service nodes, identify one or more service-functions hosted by each of the service nodes;
define, at the service controller, a stacked service-function chain in terms of service-functions to be applied to traffic in the network, wherein the stacked service-function chain specifies at least one additional classifier node, and wherein the stacked service-function chain separates first and second sub-chains of the service-function chain;
identify a modifying service-function configured to change the flow specification of traffic processed by the modifying service-function;
determine that the modifying service-function is to be part of the stacked service-function chain; and
insert the at least one additional classifier node into the stacked service-function chain immediately after the modifying service-function; and
provide information descriptive of the stacked service-function chain to a classifier node in the network.

14. The non-transitory computer readable storage media of claim 13, further comprising instructions operable to:
receive one or more notifications from each of the service nodes for use in identifying one or more service-functions hosted by the respective service node; and
identify a modifying service-function based on the one or more notifications received from each of the service nodes.

15. The non-transitory computer readable storage media of claim 13, further comprising instructions operable to:
obtain an ordered list of service types; and
define a service-function chain based on the service types and predetermined definitions of the service types.

16. The non-transitory computer readable storage media of claim 13, further comprising instructions operable to:
defining a plurality of service-function chains;
providing information descriptive of the plurality of service-function chains to the classifier node; and
providing the classifier node with information useable to select one of the plurality of service-function chains for use in servicing traffic intercepted by the classifier node.

17. The non-transitory computer readable storage media of claim 16, further comprising instructions operable at a classifier node to:
determine that received traffic should be steered through one of the plurality of service-function chains; and
select a first service-function chain from the plurality of service-function chains using the information provided by the service controller, wherein the first service-function chain identifies a plurality of service-functions.

18. The non-transitory computer readable storage media of claim 16, further comprising instructions operable at a classifier node to:
dynamically map the plurality of service-functions identified by the first service-function chain to service-function instances at the plurality of service nodes.

* * * * *